United States Patent [19]

Kato et al.

[11] 4,339,205
[45] Jul. 13, 1982

[54] DEFOAMING APPARATUS

[75] Inventors: Kochi Kato, Hoya; Namio Uemura, Oga, both of Japan

[73] Assignee: Nippon Mining Company, Limited, Tokyo, Japan

[21] Appl. No.: 158,084

[22] Filed: Jun. 10, 1980

[30] Foreign Application Priority Data

Jun. 19, 1979 [JP] Japan .......................... 54-82911[U]

[51] Int. Cl.³ .............................................. B01F 7/18
[52] U.S. Cl. ........................................ 366/296; 55/87; 55/178
[58] Field of Search ............................ 99/277.1, 277.2; 366/296, 294, 295, 287, 288; 252/361; 202/264; 55/178, 87

[56] References Cited

U.S. PATENT DOCUMENTS

| 2,209,287 | 7/1940 | Simpson | 366/294 |
| 2,345,595 | 4/1944 | Gerin | 202/264 |
| 3,356,348 | 12/1967 | Paul | 252/361 |
| 3,649,557 | 3/1972 | Freedman | 252/361 |

Primary Examiner—Robert W. Jenkins
Attorney, Agent, or Firm—Sughrue, Mion, Zinn, Macpeak & Seas

[57] ABSTRACT

A defoaming apparatus for breaking foams in a fermentation tank in which the direction of rotation of defoaming blades is opposite that of agitation blades and the speed of the defoaming blades is appreciably higher than that of the agitation blades. A sleeve is rotatably mounted around the drive shaft which operates the agitation blades with defoaming blades rigidly coupled to the sleeve. The sleeve is integrally provided with an external gear. Idler gears are disposed in meshing engagement between the internal gear and external gear.

3 Claims, 2 Drawing Figures

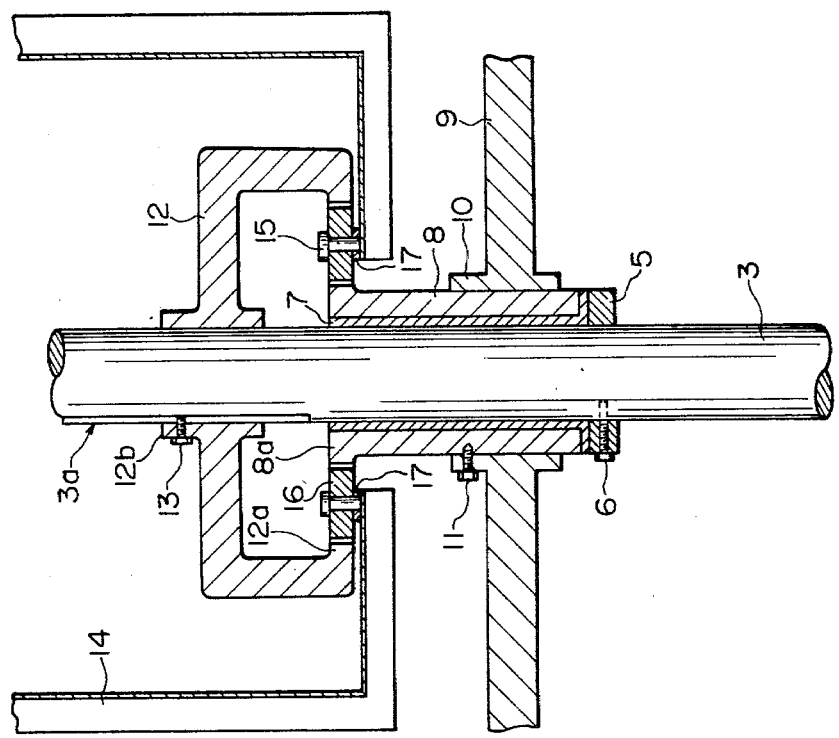
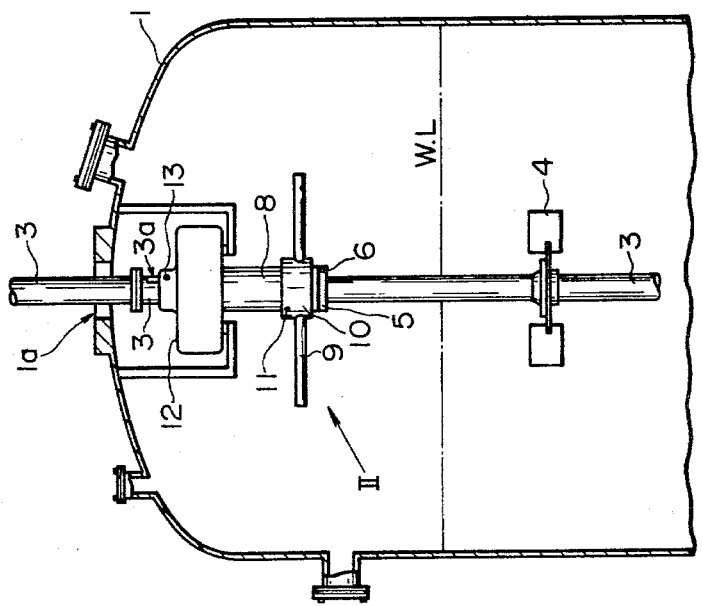

DEFOAMING APPARATUS

BACKGROUND OF THE INVENTION

The present invention relates to a defoaming apparatus for use in a fermentation tank.

In chemical processes for producing acids, for example, for producing acids such as carboxylic acids using petroleum fraction as the starting material or feeding liquid, a large volume fermentation tank is employed. In this type of fermentation tank, the liquid in the tank is forcibly aerated by an agitating device such as rotary blades. However, because of the agitation and aeration, a large quantity of foams are produced which float on the liquid surface which degrades operational efficiencies of the process.

Conventionally, foams floating on the liquid surface have been broken and dispersed by employing rotary defoaming blades. However, no consideration was paid in the conventional devices to the relationship between the rotary speed of the defoaming blades and the agitation blades or the spiral stream produced due to agitation. To be more specific, according to the conventional defoaming apparatus, the agitation blades are rotated at a speed equal to that of the defoaming blades.

SUMMARY OF THE INVENTION

It is, therefore, an object of the present invention to overcome the above-mentioned drawbacks and to provide an improved defoaming apparatus.

Another object of this invention is to provide such an apparatus which is capable of providing a high defoaming efficiency.

In accordance with the present invention, a sleeve to which defoaming blades are rigidly coupled is rotatably mounted around a shaft which rotates agitation blades. A cup shaped gear wheel whose inner end is formed as an internal gear is rigidly coupled to the shaft. The sleeve is rotatably disposed around the shaft and is formed with an external gear at one end. Further, a pair of pinions are interposed rotatably about stationary pins between the internal and external gears so that, upon rotation of the shaft, the sleeve is rotated in the opposite direction at a speed higher than the shaft. As a result, the defoaming blades are rotated in the direction opposite to the direction of rotation of the agitating blades at a speed higher than that of the agitating blades.

BRIEF DESCRIPTION OF THE DRAWINGS

In the drawings:

FIG. 1 is a schematic cross-sectional view showing a defoaming apparatus constructed according to the present invention incorporated in a fermentation tank; and FIG. 2 is an enlarged cross-sectional view showing a region II indicated in FIG. 1.

DESCRIPTION OF THE PREFERRED EMBODIMENTS

Referring now to the drawings and initially to FIG. 1, a fermentation tank 1 has a top end formed with an opening 1a through which a drive shaft 3 extends. The drive shaft 3, which extends into the liquid held in the tank 1, has a bottom end supported by a bearing (not shown) disposed on a bottom plate of the tank 1. Further, a plurality of agitating blades 4 are radially fixed to the drive shaft 3 at a position below the liquid level WL.

As shown most clearly in FIG. 2, a sleeve 8 is concentrically disposed around the drive shaft 3 in the upper portion of the tank 1 and a flange support 5 is fixed below the sleeve 8 to the shaft 3 by means of a screw 6 to support the sleeve 8. The sleeve 8 is rotatable about the shaft 3. The inner peripheral surface and bottom end surface of the sleeve 8 are formed with a liner 7 made of a material such as polytetrafluoroethylene. The sleeve 8 has an upper end formed with an external gear 8a and has a lower portion radially provided with a plurality of a defoaming blades 10 attached to sleeve 8 by screws 11. The blades 10 are slantingly directed so as to smash bubbles downwardly.

In the region above the liquid level WL a cup-shaped gear wheel 12 is fixedly and coaxially secured to the drive shaft 3 at a boss portion 12b thereof by means of a screw 13. The screw 13 is engaged with a groove 3a formed in the shaft 3 so as to prevent free rotation of the gear wheel 12 about the shaft 3. The gear wheel 12 has a lower open end formed with an internal gear 12a in alignment with the external gear 8a of the sleeve 8.

Further, a pair of L-shaped brackets 14 are attached to the inner surface of the upper wall of the tank 1 adjacent to the opening 1a. The horizontal portions of the brackets 14 are positioned below the lower open end of the gear wheel 12 and are provided with upwardly extending pins 15 at positions adjacent to the shaft 3. An idler pinion 16 is rotatably mounted on each pin 15 in meshing engagement between internal and external gears 8a and 12a. That is, the idler pinions 16 are provided in a planetary gear arrangement. In order to permit smooth rotation of the pinions, a washer 17 made of a material such as polytetrafluoroethylene is interposed between each pinion 16 and bracket 14.

In the defoaming apparatus thus constructed, since the pins 15 are stationarily positioned while the gear wheel 12 is rotated together with the drive shaft 3, the sleeve 8 is rotated in the opposite direction from the shaft 3 at a rotary speed higher than that of the shaft 3. According to the dimensions and gear ratios used in the embodiment shown in FIG. 2, the sleeve 8 is rotated at a speed about twice that of the shaft 3. Therefore, the defoaming blades move through the bubbles floating in a spiral stream on the liquid surface WL due to the action of the agitating blades 4 at very high speed relative to the spiral stream and in the rotational direction opposite to the stream. As a result, substantially all the foams are broken to thus provide a very stably operating fermentation apparatus.

With the structure of the present invention, the defoaming blades are driven with a simple gear transmission so as to provide high speed rotation in a direction opposite to the direction of rotation of the agitating blades so that the defoaming blades move through the bubbles at high speed. As a result, a quite strong and effective foam breaking action is obtained which provides an enhanced defoaming efficiency. Further, because of the use of a simple mechanism which does not require the use of independent drive shafts, the resultant apparatus is compact and simple to manufacture thus reducing the overall production cost of the fermentation apparatus.

While the invention has been described in detail with reference to a specific preferred embodiment thereof, it will be apparent to one skilled in the art that various changes and modifications can be made thereto without departing from the spirit and scope of the invention.

What is claimed is:

1. A defoaming apparatus for breaking foams floating on a liquid in a fermentation tank comprising:
   a drive shaft;
   rotary agitation blades rigidly coupled to said drive shaft adapted to forcibly agitate said liquid;
   rotary defoaming blades adapted to break foams floating on said liquid, both said agitation and defoaming blades being housed in said tank;
   a sleeve rigidly coupled to said defoaming blades rotatably mounted on said drive shaft;
   transmission gear means for rotatably driving said sleeve in a direction opposite to the direction of rotation of said drive shaft at a speed higher than that of said drive shaft; said transmission gear means comprising a cup-shaped gear wheel rigidly coupled to said shaft, said cup-shaped gear wheel having an internal gear formed integrally therewith, said sleeve being integrally provided with an external gear;
   and at least one idler gear in meshing engagement with said internal gear and said external gear.

2. The defoaming apparatus of claim 1 wherein said gear transmission means comprises planetary gear means.

3. The defoaming apparatus of claim 1 further comprising a bracket coupled to each of said idler gears through a pin, each said bracket being rigidly coupled to said fermentation tank.

* * * * *